United States Patent [19]

Matsuzaki et al.

[11] 4,220,740
[45] Sep. 2, 1980

[54] PROCESS FOR PRODUCING STABILIZED POLYOXYMETHYLENE

[75] Inventors: Kazuhiko Matsuzaki; Junzo Masamoto, both of Kurashiki, Japan

[73] Assignee: Asahi Kasei Kogyo Kabushiki Kaisha, Osaka, Japan

[21] Appl. No.: 31,913

[22] Filed: Apr. 20, 1979

[30] Foreign Application Priority Data

Apr. 21, 1978 [JP] Japan .................................. 53-46510

[51] Int. Cl.² ............................................... C08G 2/30
[52] U.S. Cl. ............................... 525/398; 260/45.8 A
[58] Field of Search ................ 525/398, 400; 528/232, 528/241; 260/45.8 A

[56] References Cited

U.S. PATENT DOCUMENTS

| 3,437,640 | 4/1969 | Schweitzer | 525/398 |
| 3,477,994 | 11/1969 | Schweitzer | 525/400 |

Primary Examiner—Lucille M. Phynes
Attorney, Agent, or Firm—Birch, Stewart, Kolasch & Birch

[57] ABSTRACT

Stabilized polyoxymethylene excellent in heat stability, base stability and mechanical properties can be produced by reacting polyoxymethylene having a number average molecular weight of 10,000 or more with 1,3-dioxepane in an organic medium in the presence of a Lewis acid and, if necessary, a molecular weight regulator.

11 Claims, No Drawings

PROCESS FOR PRODUCING STABILIZED POLYOXYMETHYLENE

This invention relates to a process for producing thermally stable polyoxymethylene. More particularly, it relates to a process for producing stabilized polyoxymethylene excellent in heat stability, base stability and mechanical properties by reacting polyoxymethylene having a number average molecular weight of 10,000 or more with 1,3-dioxepane in an organic medium in the presence of a Lewis acid.

Though polyoxymethylene is a polymer excellent in mechanical properties, it is disadvantageous in that it is somewhat poor in stabilities such as heat stability, base stability, etc.

In order to overcome this disadvantage, an attempt has been made to introduce a —C—C—linkage into the main chain of polyoxymethylene. Though stabilities can be improved by introducing —C—C— linkage, mechanical properties such as strength, rigidity and the like tend to be lowered thereby. From the viewpoint that introduction of a C—C linkage having as short a chain length as possible, namely introduction of oxyethylene group (C-C-O), is most desirable for minimizing the deterioration of mechanical properties caused by the introduction of —C—C— linkage, compounds having an oxyethylene group (C-C-O) have been used for stabilizing polyoxymethylene.

In U.S. Pat. No. 3,437,640 there is mentioned a process which comprises reacting polyoxymethylene with 1,3-dioxolane or polydioxolane. In U.S. Pat. No. 3,477,994 there is mentioned a process which comprises reacting polyoxymethylene with substituted 1,3-dioxolane or substituted 1,3-dioxane.

In Japanese Patent Publication No. 3711/1973 there is mentioned a process for introducing —C—C—O—$_2$ by reacting polyoxymethylene with 1,3,6,-trioxocane.

Though the polymers produced by these processes have —C—C—O— linkages introduced into their main chains and are improved in heat stability, their base stability in the presence of a basic substance is still lower than the requirements for practical use. Thus, the polymers produced by these processes have a unit comprising recurring —CH$_2$O— and having a terminal hydroxyl group, owing to which the polymers are still insufficient in base stability. As are well known to those skilled in the art, these polymers are usually heated in the presence of a basic substance to decompose the terminal units comprising recurring —CH$_2$O— and then put on market. These heating and decomposition steps complicate the industrial process for producing polyoxymethylene and, at the same time, necessitate treating and recovering the formaldehyde formed by the decomposition.

Further, in the stabilizing reaction of polyoxymethylene according to these processes, there occurs a side reaction called hydride shift which results in splitting of the main chain of polyoxymethylene, whereby the number average molecular weight and viscosity of the polymer are lowered, and it becomes difficult to obtain a polymer having the desired number average molecular weight and viscosity.

As concretely mentioned in Comparative Examples 3 and 4 which appear hereinafter, if a polyoxymethylene having a number average molecular weight of 66,400 is used as the starting material, the number average molecular weight decreases to 27,300 in the case of 1,3-dioxolane and to 38,900 in the case of 1,3,6-trioxocane.

According to these processes, therefore, it is necessary to use polyoxymethylene having a higher number average molecular weight and a higher viscosity and to highly purify formaldehyde monomer, polymerization medium and the like.

The present inventors have extensively studied the stabilizing reaction of polyoxymethylene and, as a result, found that stabilized polyoxymethylene having good physical properties and intended molecular weight simultaneously can be obtained in a high yield by reacting polyoxymethylene with 1,3-dioxepane in the presence of a Lewis acid in an organic medium.

It is a first object of this invention to provide a process for producing stabilized poloxymethylene excellent in heat stability, base stability and mechanical properties which comprises, contrary to the conventional expectation of those skilled in the art, introducing a —C—C—C—C—O— linkage having a prolonged length of C—C chain into the main chain of polyoxymethylene. It is a second object of this invention to provide a production process which is free from the decrease in number average molecular weight and viscosity at the time of reaction. As concretely mentioned in Example 5 which appears hereinafter, if polyoxymethylene having a number average molecular weight Mn of 66,400 is used as the starting material, stabilized polyoxymethylene having a number average molecular weight of 64,800 can be obtained according to this invention.

According to this invention, there is provided a process for producing stabilized polyoxymethylene characterized by reacting polyoxymethylene having a number average molecular weight of 10,000 or more with 1,3-dioxepane in the presence of a Lewis acid and, if necessary, a molecular weight regulator, in an organic medium.

The startng polyoxymethylene used in this invention is a polymer having recurring oxymethylene units (—OCH$_2$—), both ends of which are hydroxyl groups or one end or both ends of which are capped according to a known process. As the process for capping the polymer end, esterification, urethane formation, etherification and the like are known.

Though it is necessary that the polyoxymethylene used as starting material has a number average molecular weight of at least 10,000 the number average molecular weight is more preferably 30,000 or more if the practical performances of the stabilized of the stabilized polyoxyethylene are taken into consideration. The upper limit of the number average molecular weight is dependent mainly on the desired molecular weight of stabilized polyoxymethylene and the amount of molecular weight regulator, if the latter is used. However, it is more preferable that the upper limit is 500,000 or less.

Examples of the Lewis acid usable in this invention include the so-called Friedel-Crafts type compounds such as tin tetrachloride, tin tetrabromide, titanium tetrachloride, phenyltin trichloride, aluminum trichloride, zinc chloride, vanadium trichloride, phosphorus pentafluoride, antimony trichloride, antimony pentafluoride, boron trifluoride, coordinated boron trifluoride compounds (for example, boron trifluoride diethyl etherate, boron trifluoride dimethyl etherate, boron trifluoride dioxanate, boron trifluoride acetic anhydrate, boron trifluoride methanolate and the like), boron trichloride, boron tribromide and the like; inorganic and organic acids such as perchloric acid, acetyl perchlorate, hydroxyacetic acid, trichloroacetic acid, trifluoromethanesulfonic acid ($CF_3SO_3H$), p-toluenesulfonic acid and the like; complex salt compounds such as triphenylmethane hexafluorantimonate ($Ph_3CSbF_6$), aryldiazonium hexachlorophosphate

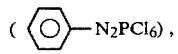

aryldiazonium tetrafluoroborate

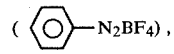

triethyloxonium tetrafluoroborate and the like; and organoaluminum compounds such as triethylaluminum, diethylaluminum chloride, and the like.

Among these Lewis acids, Friedel-Crafts type compounds and complex salt compounds are more preferable in respect of activity. However, inorganic acids and organic acids are also capable of bringing about the same effect as above, if they are used in an increased amount.

In this invention, it is also possible to regulate the molecular weight of the stabilized polyoxymethylene to any desired value by using a molecular weight regulator.

The molecular weight regulators usable in this invention include acetal compounds, orthoformic esters, alcohols, carboxylic acids and carboxylic acid anhydrides.

The first group of said acetal compounds includes formal compounds and hemiformal compounds represented by $ROCH_2OR$ and $HOCH_2OR$, respectively, wherein R is a straight or branched chain alkyl group having 1-8 carbon atoms. Specific examples of the first group of acetal compounds include methylal, diethoxymethane, di-iso-propoxymethane, di-n-butoxymethane, butoxyhydroxymethane and the like.

The second group of said acetal compounds includes polyacetal compounds represented by $RO(CH_2O)_nR$, wherein R is a straight or branched chain alkyl group having 1-8 carbon atoms and n is an integer of 2-20. Specific examples of the second group of acetal compounds include dioxymethylene dimethoxide, tetraoxymethylene dioctoxide, decaoxymethylene diisopropoxide, dioxymethylene diethoxide and the like. In many cases, it is difficult to isolate these compounds in the form of a single compound and they are usually employed as a mixture. The degree of polymerization (n) of these compounds can be determined by means of nuclear magnetic resonance spectroscopy (N.M.R.), gas chromatography (G.C.), liquid chromatography (L.C.) or the like.

The third group of said acetal compounds includes acetal compounds represented by

wherein R is a straight or branched chain alkyl group having 1-8 carbon atoms. Specific examples of the third group of acetal compounds include dimethylacetal, diethylacetal, di-isopropylacetal, di-t-butylacetal, dihexylacetal, dioctylacetal and the like.

Said orthoformic esters are compounds represented by $HC(OR)_3$, wherein R is a group selected from straight chain alkyl groups having 1-4 carbon atoms and phenyl group. Specific examples of said orthoformic esters include methyl orthoformate, ethyl orthoformate, diethylpropyl orthoformate, propyl orthoformate, phenyl orthoformate and the like.

Said alcohols are compounds represented by ROH, wherein R is a group selected from straight or branched chain alkyl groups having 1-20 carbon atoms and aryl groups. Specific examples of the alcohols inlcude aliphatic alcohols such as methanol, ehtanol, n-propanol, iso-butanol, lauryl alcohol, stearyl alcohol and the like; and aromatic alcohols such as benzyl alcohol, 2-phenylethanol and the like.

Said carboxylic acids are compounds represented by RCOOH, wherein R is hydrogen or a group selected from straight or branched chain alkyl groups having 1-20 carbon atoms and aryl groups. Specific examples of the carboxylic acids include aliphatic carboxylic acids such as formic acid, acetic acid, propionic acid, lauric acid, stearic acid and the like; and aromatic carboxylic acids such as benzoic acid, iso-phthalic acid and the like.

Said carboxylic acid anhydrides are compounds represented by

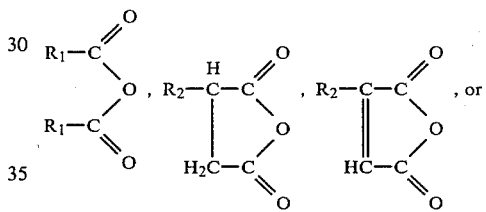

wherein $R_1$ is a straight chain alkyl group having 1-20 carbon atoms; $R_2$ is hydrogen or a straight chain alkyl group having 1-20 carbon atoms; and $R_3$ is hydrogen or a straight or branched chain alkyl group having 1-8 carbon atoms. Specific examples of said carboxylic acid anhydrides include aliphatic carboxylic acid anhydrides such as acetic anhydride, propionic anhydride, stearic anhydride, succinic anhydride, dodecenylsuccinic anhydride, maleic anhydride and the like; and aromatic carboxylic acid anhydrides such as phthalic anhydride, 4-methylphthalic anhydride and the like.

Among these molecular weight regulators, formal compounds represented by $ROCH_2OR$, polyacetal compounds represented by $RO(CH_2O)_nR$ and acetal compounds representd by

are preferable from the viewpoint of heat stability and base stability of polymer. Further, among them, methylal and diethylacetal are particularly preferable in respect of the readiness of purification and the availability.

The organic media usable in this invention include aliphatic hydrocarbons such as n-pentane, n-hexane, n-heptane, n-octane, cyclohexane, cyclopentane and the like; aromatic hydrocarbons such as benzene, toluene, xylene and the like; halogenated aliphatic hydrocarbons such as methylene chloride, chloroform, carbon tetrachloride, ethylene chloride, trichloroethylene and the like; halogenated aromatic hydrocarbons such as chlorobenzene, o-dichlorobenzene, α-chloronaphthalene and the like; and ether compounds such as ethyl ether, tetrahydrofuran, dioxane and the like. These organic media may be used either alone or in mixture of two or more.

1,3-Dioxepane used in this invention is usually synthesized by reacting 1,4-butanediol with formaline or paraformaldehyde in the presence of an acid catalyst such as sulfuric acid. The impurities present in the 1,3-dioxepane should be removed as completely as possible prior to the reaction by means of distillation, adsorption or the like.

1,3-Dioxepane is used in a proportion of 0.1–100 parts by weight, preferably 1–50 parts by weight, per 100 parts by weight of the starting polyoxymethylene. 1,3-Dioxepane is uniformly dissolved in an organic medium containing polyoxymethylene and, if necessary, a molecular weight regulator. When the concentration of 1,3-dioxepane in the organic medium is maintained at not more than the concentration (M) defined by the following equation, there can be obtained particularly excellent results in heat stability, base stability and mechanical properties of the polymer;

$$M = 0.81t + 32.6$$

wherein M is the concentration of 1,3-dioxepane (g/liter) and t is the reaction temperature (°C).

In many cases, it is usual to adjust the concentration of 1,3-dioxepane in the organic medium at not more than the value defined by the above-mentioned equation and then regulate the concentration of polyoxymethylene so that the amount of 1,3-dioxepane falls in the range of 0.1–100 parts by weight, preferably 1–50 parts by weight, per 100 parts by weight of polyoxymethylene.

The organic medium used in this invention is substantially a nonsolvent or a poor solvent for the polyoxymethylene, so that the polyoxymethylene is handled as a slurry. Though the upper limit of the concentration of polyoxymethylene in the organic medium is not particularly restricted, those skilled in the art can decide the upper limit by themselves, considering the handling of slurry.

The reaction temperature is usually adjusted to 0°–150°C. More preferably, it is adjusted in connection with the concentration of 1,3-dioxepane in the organic medium, as shown in the above-mentioned equation.

Though the duration of reaction is not particularly limited, it is adjusted in the range of 5–300 minutes.

When a molecular weight regulator is used, it is also uniformly dissolved in the organic medium. The concentration of the molecular weight regulator in the organic medium can readily be decided experimentally in accordance with the desired molecular weight of the stabilized polyoxymethylene.

When an organic medium containing polyoxymethylene, 1,3-dioxepane and, if necessary, a molecular weight regulator is heated or cooled to a given temperature and subsequently a Lewis acid is added to start the reaction. After a given period of time has passed, the polymer is usually separated from the organic medium and then heated in water or an alcohol together with a basic substance such a amine, ammonia, NaOH or the like. After addition of a conventional stabilizer or the like, the stabilized polymer is put in practical use.

As has been detailed above, it has become possible to obtain stabilized polyoxymethylene by employing the process of this invention. The characteristic features of this invention are as follows:

(1) Stabilized polyoxymethylene excellent in heat stability, base stability and mechanical properties can be produced.

(2) In the stabilization reaction, there hardly occurs a decrease in number average molecular weight.

(3) Owing to the use of a molecular weight regulator, the stabilized polyoxymethylene with an intended molecular weight can be obtained.

(4) Owing to the use of a specific molecular weight regulator, the molecular weight can be regulated and, at the same time, the base stabilization yield can be improved.

In the following description, the number average molecular weights of polymers were calculated from quantitative analysis of end group. The terminal methoxy group (—OCH$_3$) was determined by the Zeisel method, while the terminal hydroxyl group (—OH) was determined by converting it to acetyl group

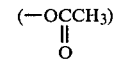

and then analyzing the acetyl group by infrared absorption spectroscopy. Terminal carbonyl groups other than acetyl group

wherein R is hydrogen or an alkyl group) were also determined by infrared absorption spectroscopy.

Reduced viscosities were measured at 60° C. at a polymer concentration of 0.5 g/dl in a solvent mixture consisting of p-chlorophenol and tetrachloroethylene (1:1 by weight).

Melting points were measured by the D.S.C. method at a heating rate of 16° C./min.

Base stabilities are expressed by the base stabilization yeild after heating a polymer at 140° C. for 60 minutes in benzyl alcohol containing 1% of tributylamine at a polymer concentration of 5%.

K$_{222}$(% min.) denotes a thermal decomposition rate constant of polymer at 222° C. in vacuum.

Mechanical properties are represented by tensile strength at yield and elongatoin at break measured according to ASTM D-638.

This invention will be illustrated by the following Examples but is not limited thereto.

EXAMPLE 1

Into a four-necked flask equipped with a stirrer, a thermometer and a catalyst inlet were charged 50 g of polyoxymethylene dimethoxide having a number average molecular weight of 50,600 as measured by quantitative analysis of methoxy end group according to the Zeisel method and having a reduced viscosity of 2.33 which has been sufficiently dried in vacuum, 20 g of 1,3-dioxepane sufficiently purified with Zeolite and 500 ml of substantially anhydrous toluene which had been distilled over metallic sodium, and the contents were heated to 50° C. Then, a solution of $5 \times 10^{-4}$ mole of boron trifluoride diethyl etherate in 5 ml of toluene was added through the catalyst inlet to start the reaction. The contents of the flask were kept at 50° C. for 30 minutes, after which 1 ml of tributylamine was added to terminate the reaction. The polymer was collected by filtration, washed 5 times with methanol and vacuum-dried at 60° C. for 5 hours to obtain 50 g of a polymer. The polymer has a number average molecular weight of 48,200, a reduced viscosity of 2.16 and a melting point of 166° C. The base stabilization yield of this polymer was 97.5%, and the $K_{222}$ value of the base-stabilized polymer was 0.02%/min. The base-stabilized polymer was mixed with a stabilizer and molded to obtain a molded product which was excellent in surface gloss, was tough, and had a film-formability. The molded product obtained has a tensile strength at yield of 692 kg/cm$^2$ and an elongation at break of 52% and was excellent in heat stability, base stability and mechanical properties.

EXAMPLE 2

Into a flask were charged 200 g of polyoxymethylene dimethoxide having a number average molecular weight of 49,200 and a reduced viscosity of 2.60, 80 g of 1,3-dioxepane and 1,000 ml of cyclohexane, to which was added $1 \times 10^{-3}$ mole of tin tetrachloride to start the reaction. After the inner temperature of the flask was maintained at 40° C. for 40 minutes, ammonia water was added to terminate the reaction. The polymer was collected by filtration, washed and then vacuum-dried to obtain 201 g of a polymer. This polymer had a number average molecular weight of 46,000, a reduced viscosity of 2.08, and a melting point of 163° C. The base stabilization yield of the polymer was 93%. After the base stabilization, the stabilized polyoxymethylene had a $K_{222}$ value of 0.07%/min., a tensile strength at yield of 675 kg/cm$^2$ and an elongation at break of 42%.

EXAMPLE 3

Into a flask were charged 200 g of polyoxymethylene dihydroxide having a number average molecular weight of 66,400 as determined by acetylating the polymer and following quantitative analysis of the acetyl end group, 30 g of 1,3-dioxepane, 0.07 g of methylal as a molecular weight regulator and 1,000 ml of n-hexane. The reaction was started by adding $5 \times 10^{-4}$ mole of triethyloxonium tetrafluoroborate (Et$_3$OBF$_4$) synthesized by reacting boron trifluoride diethyl etherate with epichlorohydrin in tetrahydrofuran.

The contents of the flask were maintained at 45° C. for 40 minutes. The reaction was terminated by adding 2 ml of tributylamine. Then, the contents were filtered, washed and dried to obtain 198 g of a polymer. This polymer had a number average molecular weight of 34,800, a reduced viscosity of 1.66 and a melting point of 166° C. The base stabilization yield of the polymer was 97.5%. After the base stabilization, the polymer had a $K_{222}$ value of 0.02%/min. The base-stabilized polymer was molded to obtain a molded product having such good mechanical properties that its tensile strength at yield was 698 kg/cm$^2$ and its elongation at break was 40%.

EXAMPLE 4

The procedure of Example 3 was repeated by using all the same reagents as in Example 3, except that, among the reagents used in Example 3, 1,3-dioxepane was used in an amount of 72 g. The results obtained are shown in Table 1.

EXAMPLES 5–10

The procedure of Example 3 was repeated by using all the same reagents as in Example 3, except that the methylal as a molecular weight regulator was replaced by a molecular weight regulator as shown in Table 1. The results obtained are shown in Table 1.

COMPARATIVE EXAMPLE 1

The procedure of Example 3 was repeated by using all the same reagents as in Example 3, except that the 1,3-dioxepane was replaced by 30 g of sufficiently purified and substantially anhydrous 1,3-dioxolane. The results obtained are shown in Table 1. The polymer after the reaction had a greatly decreased number average molecular weight and viscosity. After the base stabilization, the recovery of polymer was low.

COMPARATIVE EXAMPLE 2

The procedure of Example 3 was repeated by using all the same reagents as in Example 3 except that the 1,3-dioxepane was replaced by 45 g of 1,3,6-trioxocane. The results obtained are shown in Table 1.

COMPARATIVE EXAMPLE 3

The procedure of Example 3 was repeated by using all the same reagents as in Example 3 except that the 1,3-dioxepane was replaced by 30 g of 1,3-dioxolane and the methylal as a molecular weight regulator was not used. The results obtained are shown in Table 1.

COMPARATIVE EXAMPLE 4

The procedure of Example 3 was repeated by using all the same reagents as in Example 3 except that the 1,3-dioxepane was replaced by 45 g of 1,3,6,-trioxocane and the methylal as a molecular weight regulator was not used. The results obtained are shown in Table 1.

EXAMPLE 11

A polymer was prepared by polymerizing anhydrous formaldehyde with dibutyltin dilaurate as a polymerization catalyst. Then, the end groups of this polymer were esterified with acetic anhydride to obtain polyoxymethylene diacetate having a number average molecular weight of 77,400 and a reduced viscosity of 3.85.

Into a flask were charged 300 g of this polyoxymethylene diacetate, 20 g of 1,3,-dioxepane, 0.12 g of polyoxymethylene dimethoxide having the following composition as a molecular weight regulator and 1,000 ml of trichloroethylene.

| Composition of polyoxymethylene dimethoxide $CH_3O(CH_2O)_nCH_3$ | |
|---|---|
| n | Composition (%) |
| 5 | 3 |
| 6 | 10 |
| 7 | 30 |
| 8 | 28 |
| 9 | 16 |
| 10 | 10 |
| 11 | 3 |

The reaction was started by adding, to the flask, $6 \times 10^{-4}$ mole of boron trifluoride acetic anhydrate synthesized by absorbing boron trifluoride into acetic anhydride. The contents of the flask were maintained at 60° C. for 15 minutes, after which dibutylamine was added to terminate the reaction and the polymer was filtered, washed and dried. This polymer weighed 297 g and had a number average molecular weight of 44,700, a reduced viscosity of 2.03 and a melting point of 165° C. The base stabilization yield was 97.5%. After the base stabilization, the polymer had a $K_{222}$ value of 0.03%/min. A molded product of this polymer had a tensile strength at yield of 699 kg/cm$^2$ and an elongation at break of 59%.

EXAMPLES 12-17

The procedure of Example 11 was repeated by using all the same reagents as in Example 11, except that the boron trifluoride acetic anhydride and the polyoxymethylene dimethoxide as a molecular weight regulator were replaced by a Lewis acid and a molecular weight regulator as shown in Table 2. The results obtained are shown in Table 2.

COMPARATIVE EXAMPLE 5

The procedure of Example 11 was repeated by using all the same reagents as in Example 11 except that the 1,3-dioxolane was replaced by 20 g of 1,3-dioxolane. The polymer obtained weighed 296 g and had a number average molecular weight of 11,800, a reduced viscosity of 0.80 and a melting point of 163° C. The base stabilization yield of the polymer was 90%. After the base stabilization, the polymer had a $K_{222}$ value of 0.08%/min. and an elongation at break of 21%.

COMPARATIVE EXAMPLE 6

The procedure of Comparative Example 5 was repeated, except that the 1,3-dioxolane was replaced by 20 g of 1,3,6-trioxocane. The polymer obtained had a number average molecular weight of 23,300 and a reduced viscosity of 1.23. After the base stabilization, the polymer had a $K_{222}$ value of 0.08%/min. and an elongation at break of 25%.

Table 1

| Example | Amount of 1,3-dioxepane charged (g) | Molecular weight regulator Kind | Amount (g) | Yield (g) | Number average molecular weight |
|---|---|---|---|---|---|
| 4 | 72 | Methylal | 0.07 | 201 | 29,400 |
| 5 | 30 | — | — | 199 | 64,800 |
| 6 | " | Propionic anhydride | 0.27 | 199 | 34,500 |
| 7 | " | Acetic acid | 0.10 | 198 | 34,800 |
| 8 | " | n-Hexanol | 0.13 | 198 | — |
| 9 | " | Methyl orthoformate | 0.10 | 198 | 34,000 |
| 10 | " | Diethylacetal | 0.09 | 198 | — |
| Comparative Example 1 | 1,3-Dioxolane 30 | Methylal | 0.07 | 189 | 8,500 |
| Comparative Example 2 | 1,3,6-Trioxacane 45 | Methylal | 0.07 | 196 | 26,500 |
| Comparative Example 3 | 1,3-Dioxolane 30 | — | — | 197 | 27,300 |
| Comparative Example 4 | 1,3,6-Trioxocane 45 | — | — | 198 | 38,900 |

| Reduced viscosity | Melting point (°C.) | Base stabilization yield (%) | $K_{222}$ (%/min.) | Tensile strength at yield (kg/cm$^2$) | Elongation at break (%) |
|---|---|---|---|---|---|
| 1.46 | 163 | 94 | 0.07 | 679 | 32 |
| 2.79 | 166 | 93 | 0.04 | 688 | 62 |
| 1.65 | 166.5 | 93 | 0.05 | 690 | 33 |
| 1.66 | 166 | 93 | 0.05 | 691 | 34 |
| 1.63 | 165 | 94 | 0.04 | 690 | 34 |
| 1.63 | 166 | 95 | 0.04 | 689 | 35 |
| 1.64 | 165 | 98 | 0.02 | 695 | 41 |
| 0.08 | 161 | 80 | 0.08 | Unmoldable due to low viscosity | |
| 1.35 | 163 | 89 | 0.10 | 671 | 18 |
| 1.38 | 163 | 85 | 0.09 | 665 | 18 |
| 1.80 | 164 | 90 | 0.10 | 672 | 30 |

Table 2

| Example | Lewis acid Kind | Amount ($\times 10^{-4}$ mole) | Molecular weight regulator Kind | Amount (g) | Yield (g) |
|---|---|---|---|---|---|
| 12 | Aluminum trichloride | 6 | Diethoxymethane | 0.09 | 295 |
| 13 | Antimony pentafluoride | 5 | — | — | 296 |
| 14 | Acetyl perchlorate | 3 | — | — | 297 |
| 15 | p-Toluenesulfonic acid | 25 | Propyl orthoformate | 0.11 | 296 |
| 16 | Triphenylmethane hexafluoroantimonate | 3 | Stearyl alcohol | 0.25 | 298 |
| 17 | Hydroyacetic acid | 40 | Benzoic acid | 0.14 | 295 |

| | Melting | Base stabilization | | Tensile strength | Elongation |

Table 2-continued

| Reduced viscosity | point (°C.) | yield (%) | $K_{222}$ (%/min.) | of yield (kg/cm$^2$) | at break (g) |
|---|---|---|---|---|---|
| 2.10 | 165 | 97 | 0.03 | 701 | 58 |
| 3.58 | 167 | 93 | 0.05 | 685 | 65 |
| 3.40 | 167 | 93 | 0.05 | 687 | 64 |
| 2.08 | 165 | 95 | 0.05 | 690 | 56 |
| 2.01 | 164 | 94 | 0.06 | 683 | 55 |
| 1.98 | 165 | 93 | 0.05 | 689 | 51 |

What is claimed is:

1. A process for producing a stabilized polyoxymethylene characterized by reacting polyoxymethylene having a number average molecular weight of 10,000 or more with 1,3-dioxepane in the presence of a Lewis acid in an organic medium.

2. A process according to claim 1, wherein the concentration of 1,3-dioxepane in the organic medium at the time of reaction is maintained at not more than the concentration (M) defined by the following equation:

$$M = 0.81t + 32.6$$

wherein M is the concentration of 1,3-dioxepane (g/liter) and t is the reaction temperature (°C.).

3. A process according to claim 1 or 2, wherein the amount of 1,3-dioxepane is 0.1–100 parts by weight per 100 parts by weight of the starting polyoxymethylene.

4. A process according to claim 1 or 2, wherein the amount of 1,3-dioxepane is 1–50 parts by weight per 100 parts by weight of the starting polyoxymethylene.

5. A process according to claim 1 or 2, wherein a molecular weight regulator is allowed to coexist at the time of the reaction.

6. A process according to claim 5, wherein the molecular weight regulator is a compound selected from the group consisting of acetal compounds represented by ROCH$_2$OR wherein R is an alkyl group, RO(CH$_2$O)$_n$R wherein R is an alkyl group and n is an integer of 2–20, and

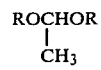

wherein R is an alkyl group.

7. A process according to claim 6, wherein the acetal compound is methylal or diethylacetal.

8. A process according to claim 1 or 2, wherein the reaction is carried out at a temperature of 0°–150° C. for 5–300 minutes.

9. A process according to claim 1 or 2, wherein the Lewis acid is a Friedel-Crafts type compound or a complex salt compound.

10. A process according to claim 1 or 2, wherein the Lewis acid is boron trifluoride diethyl etherate, tin tetrachloride, triethyloxonium tetrafluoroborate or boron trifluoride acetic anhydrate.

11. The stabilized polyoxymethylene obtained by the process of claim 1.

* * * * *